United States Patent Office 3,068,878
Patented Dec. 18, 1962

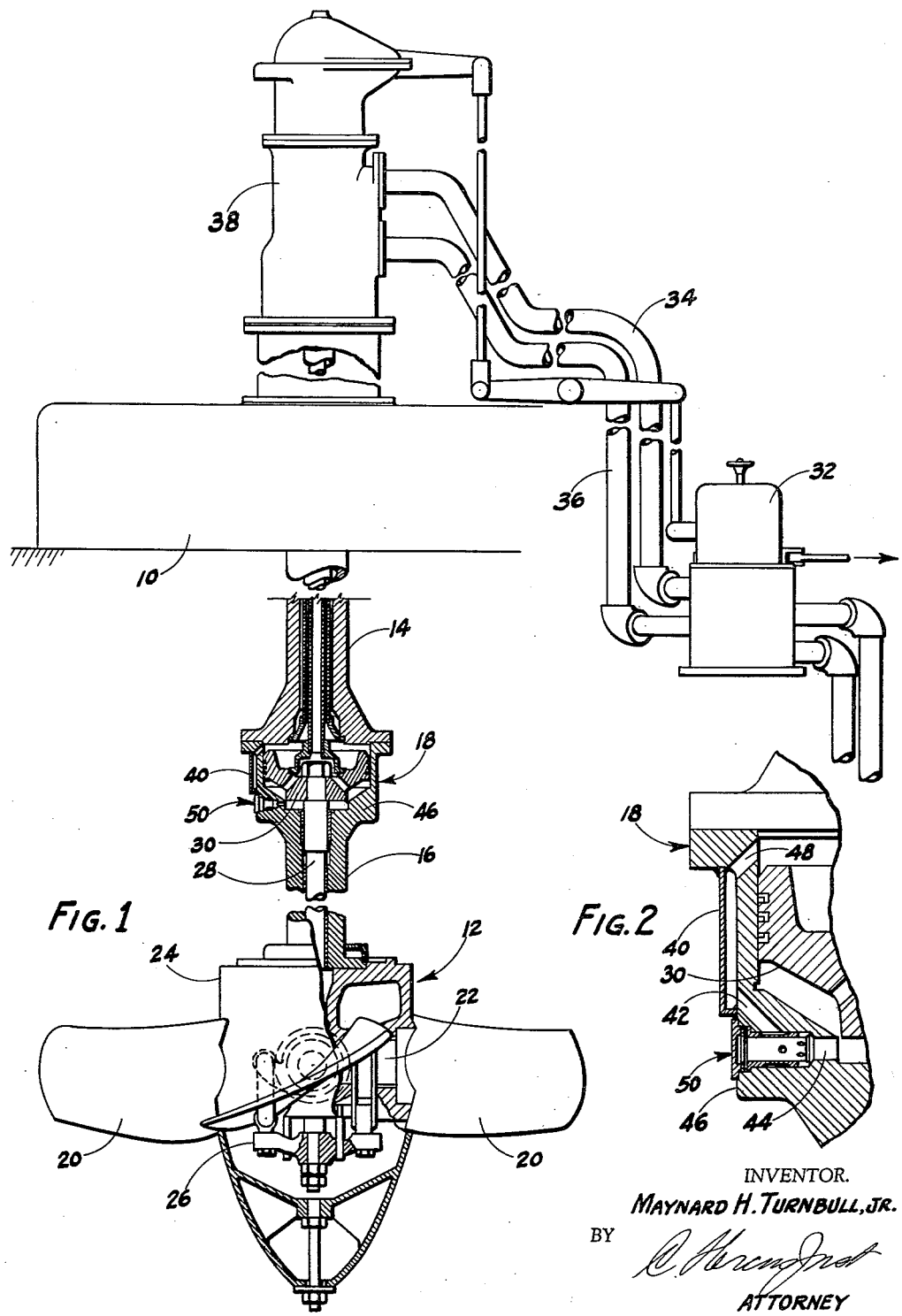

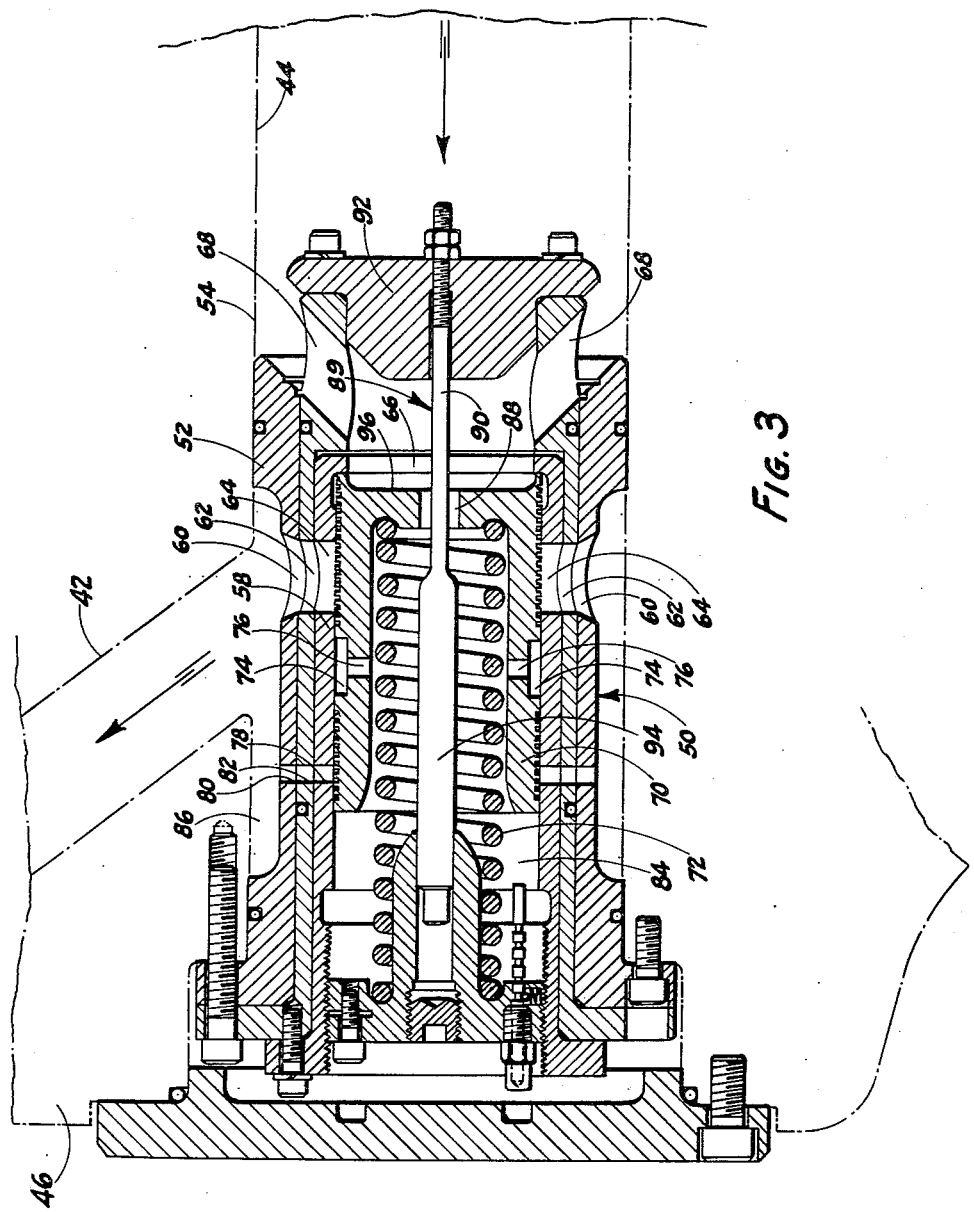

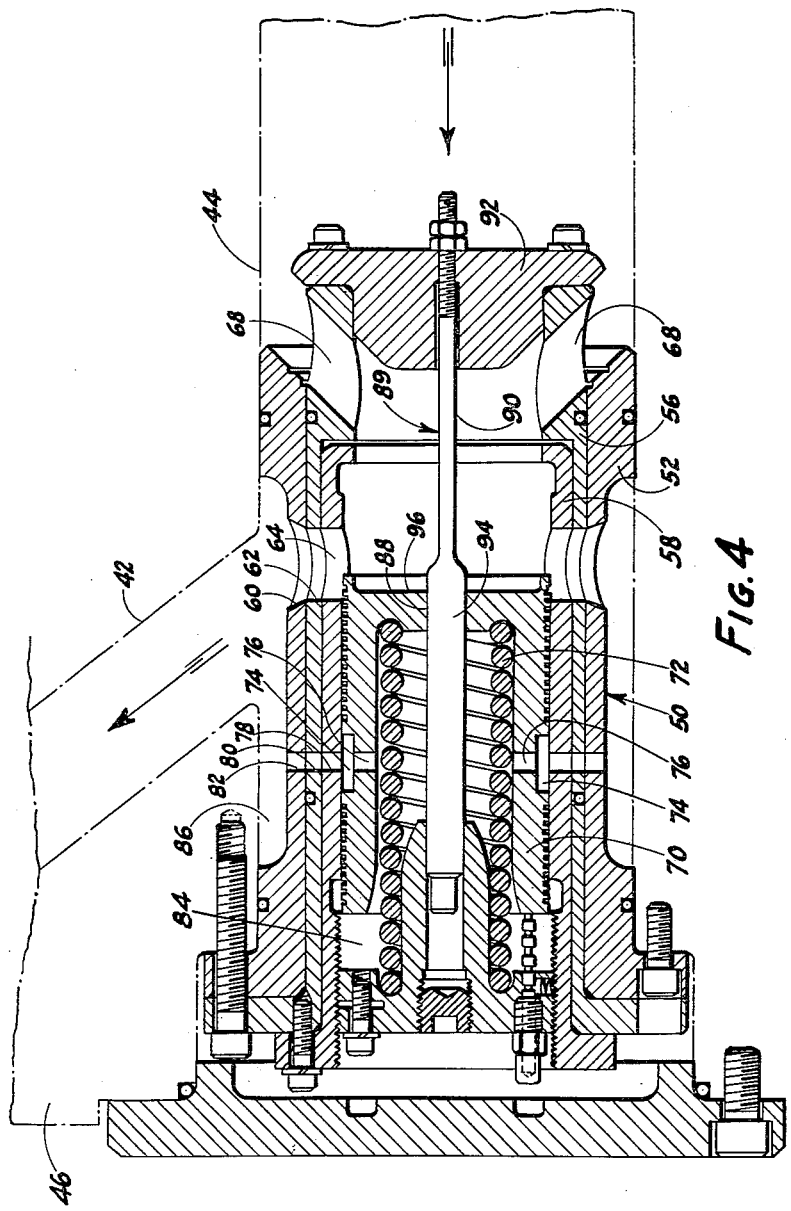

3,068,878
RELIEF VALVE UNIT FOR ADJUSTABLE
BLADE TURBINE
Maynard H. Turnbull, Jr., York, Pa., assignor to Allis-Chalmers Manufacturing Company, Milwaukee, Wis., a corporation of Delaware
Filed Nov. 13, 1959, Ser. No. 852,804
7 Claims. (Cl. 137—56)

The present invention pertains to a relief valve unit for an adjustable blade turbine and, more particularly, to an adjustable blade turbine of the type employed in the production of current by hydro-electric plants. The blades of the turbines employed in such installations preferably are adjustable as to pitch so as to obtain the optimum efficiency of the turbine under its entire range of operation. Essentially, the turbine runner blades are pivotally supported by a hub from which the blades project uniformly, the hub having suitable bearings which pivotally receive trunnions projecting from the blades, whereby the blades can be varied in pitch, simultaneously, between predetermined optimum open and closed positions within required limits by the use of a hydraulic cylinder, for example, in a servomotor. The pitch of the blades may be varied in either direction through a predetermined range, as dictated by a governor embodied in the normal control system for each turbine.

If the hydro-electric unit, while operating under load at normal speed, is for example, suddenly disconnected from its load, such as by the opening of the switch connecting the generator outgoing terminals to the power transmission line, the governor and control system normally function to move the wicket gates, which control the flow of the water supply to the turbine, to closed position, thus shutting off such water supply so as to stop the unit. The blades of the turbine runner also simultaneously are moved to closed position when this occurs. However, if these devices do not function normally and relatively quickly, so-called runaway speeds may be developed by the turbine and the generator driven thereby.

In turbines of the type described, maximum runaway speeds normally amount to at least of the order of 2½ times the normal speed of the turbine. Accordingly, it is necessary to design generators to withstand such maximum contemplated runaway speeds, unless suitable control mechanism is available and is employed to reduce the speed of the turbine below a predetermined amount, should so-called runaway speeds develop. The resulting cost of turbines and generators which can withstand such speeds is far greater than if the same only had to withstand lower speeds in excess of normal.

Prior Patent No. 2,824,716, issued February 25, 1958, in the name of Grant H. Voaden, and assigned to the assignee of the instant invention, is direction to a mechanism for limiting runaway speed of adjustable blade turbines and illustrates a number of different embodiments by which such runaway speeds can be reduced automatically to a predetermined safe speed, whereby the turbine and generator driven thereby need not necessarily be designed to withstand runaway speeds of the order of 2½ times normal speed, for example, but rather may be designed to withstand speeds of possibly only 1½ times that of normal desired speed. Very substantial savings in manufacturing costs result from this. Attention is directed to such prior patent for details of the exemplary runaway speed control mechanisms illustrated therein, as well as for other details of normal operating mechanism of a hydraulic turbine having adjustable blades, in the event all of such details are not explained hereinafter.

While said aforementioned patent pertains to the essential features of a number of different types of mechanisms for controlling the runaway speed of adjustable blade turbines, it was found that, in regard to adopting devices of this type to actual commercial installations, further means are useful and desirable in regard, particularly, to installing, inspecting, and withdrawing some of said control mechanism. Accordingly, these needs resulted in the production of improvements comprising the subject matter of U.S. Patent 2,922,621, issued January 26, 1960, in the name of Jacob Fisch, and assigned to the assignee of the instant invention.

It will be seen from the mechanism described in said Fisch patent that the improvement primarily comprises cylindrical slide valve members which surround a runaway speed control valve which, specifically, is operated by centrifugal force so as automatically to by-pass fluid from the pressure end of the servomotor cylinder to the opposite end thereof, automatically, when speeds in excess of a predetermined amount above normal are reached by the turbine, thereby to permit the blades of the adjustable blade turbine to move quickly and automatically to the fullest open position thereof permitted in accordance with the setting and adjustment of the mechanism controlling the movement of said blades. The servomotor referred to controls the position of the turbine blades relative to the hub which supports the same for movement about the trunnions of the blades. It will be further understood that the operation of the servomotor normally is controlled by a well known type of governor responsive to variations in the load upon the generator which is driven by a turbine of the type to which the present invention pertains.

When utilizing a runaway speed control device embodying, for example, a radially movable piston which is responsive to centrifugal force and normally closes a passageway between communicating ports leading to and from the opposite ends of a servomotor cylinder of the blade positioning means of a hydraulic turbine, and the outward radial movement of said control valve piston is controlled by a compressible spring which, for example, is calibrated and set so that the valve piston will be moved by said centrifugal force to open or unblock the fluid passageway when a speed of a predetermined amount is reached by the turbine, a hydraulic unbalance is introduced when the piston begins to open the ports of said fluid passageway. This hydraulic unbalance force varies with the pressure drop through the ports of the passageway comprising the fluid by-pass between opposite ends of the servomotor cylinder, whereby the action of the device is dependent very largely upon the amount of such pressure drop. This is an undesirable situation in that it affects the speed of movement of the valve piston after the ports of the fluid by-pass passage commence to open and results in a somewhat erratic, creeping action as the rotational speed of the turbine increases, for example.

It is a principal object of the present invention to provide a relief valve unit for an adjustable blade turbine comprising a runaway speed limiting device which will operate at a consistent speed, regardless of imposed, varying hydraulic pressures existing in the fluid by-pass passageway of the servomotor cylinder during the operation thereof.

A further object of the invention is to provide a relief valve unit for adjustable blade turbines comprising a runaway speed limiter which will be operable to effect an opening of the fluid passageway to maximum position positively and rapidly upon the turbine reaching a speed in excess of a predetermined desired amount, such rapid opening of the valve piston to maximum discharge position resulting in substantially the full port area being opened quickly and remaining open until the pressures at the opposite sides of the servomotor piston are substantially equalized, during which time the blades of the turbine will have been moved quickly to the fullest permitted open position.

A further object of the invention is to provide such relief valve unit which is fool-proof in operation, relatively simple in construction, capable of operating satisfactorily for long periods without attention, and also being capable of being fabricated at relatively little additional cost, particularly when considering the increased safety and efficiency of operation of the runaway speed control mechanism with which the invention is associated and the protection afforded very expensive equipment with which said valve unit is associated.

Details of the foregoing objects and of the invention, as well as othre objects thereof, are set forth in the following specification and illustrated in the accompanying drawings comprising a part thereof.

In the drawings:

FIG. 1 is a vertical elevation, partly in section and partly diagrammatic, of an exemplary installation of a hydroelectric unit having an embodiment of runaway speed control means to which the present invention is applicable and the illustration of the latter being shown in vertical section to illustrate details thereof in said figure.

FIG. 2 is an enlarged vertical sectional view of the portion of the hydro-electric unit shown in FIG. 1 and to which the present invention pertains, said view being on a considerably larger scale than that employed in FIG. 1 so as better to illustrate details of the present invention.

FIGS. 3 and 4 respectively are vertical sectional views, both on similar scales that are larger than that employed in FIG. 2, and illustrating respectively a relief valve unit embodying the present invention and in which the valve member of said unit is shown in closed position in FIG. 3 and in open position in FIG. 4.

Referring to FIG. 1, an exemplary generator 10 is shown diagrammatically relative to the exemplary turbine 12 which drives the generator by means of a shaft composed of a pair of sections 14 and 16 respectively extending upward and downward from a servomotor 18. The blades 20 of the turbine 12 are adjustable about the axes of the blade trunnions 22 which are rotatably supported by the hub 24. The position of the blades 20 is controlled by a cross-head 26, actuated by piston rod 28 which, at its upper end, is connected to piston 30 of servomotor 18.

Flow of servomotor-operating fluid to and from opposite ends of the piston and cylinder of the servomotor 18 takes place through passageways in the turbine shaft sections 14 and 16, as controlled by the normal control valve unit 32. Fluid conduits 34 and 36 lead to and from the control valve unit 32 and are connected to the oil head 38, which normally surmounts the generator 10, for transmission therethrough to the servomotor.

A fluid by-pass conduit 40 extends between ports or passages 42 and 44 in the lower end of the cylinder 46 of the servomotor, and port or passage 48 in the upper end thereof, as clearly seen in FIG. 2. Disposed between the ports or passages 42 and 44 is a relief valve unit 50 which is provided for purposes of automatically controlling runaway speed in the turbine and generator and effecting reduction thereof to a safe limit when runaway speeds occur in excess of a predetermined amount for which the relief valve unit is set. The present invention pertains to the relief valve unit 50, details of which are best shown in FIGS. 3 and 4 and which details now will be described.

The valve unit 50 illustrated in FIGS. 3 and 4 embodies a slide valve arrangement comprising the essential subject matter of said Fisch patent and to which attention is directed for the details, advantages, characteristics and the like, of such slide valve structure which are not described herein. For purposes of the present invention, it is intended to minimize the description of such slide valve details as much as possible, since the same do not comprise part of the present invention. Accordingly, it is believed sufficient merely to explain that such valve assembly comprises a hollow housing 52 which fits within a complementary, radially extending opening 54 within the wall of cylinder 46; a cylindrical sleeve valve 56 is longitudinally slidable within the hollow housing 52; and a cartridge cylinder 58 is complementary to and disposed within the sleeve valve 56.

The normal operating positions of the hollow housing 52, sleeve valve 56, and cartridge cylinder 58, are as illustrated in FIGS. 3 and 4. In such position, the three interfitting elements are provided with radially extending ports 60, 62, and 64 respectively, especially for effecting communication between the interior of cartridge cylinder 58 and the port 42. Cartridge cylinder 58 also has a circular opening 66 in the inner end thereof which communicates with angularly extending openings 68 within an inner extension on the sleeve valve 56, the opening 68 communicating with the interior of ports 44 within the cylinder wall 46. For purposes of this description, it should be understood that the port 42 communicates with the upper end of the cylinder 46 and servomotor piston 30, while the port 44 communicates with the lower end of the cylinder 46 and piston 30.

Slidably mounted within the cartridge cylinder 58 is relief valve piston 70. Said piston is cup-shaped, as is clearly shown in FIGS. 3 and 4, the same receiving one end of a compressible spring 72 of desired strength and calibrated to offer a desired amount of resistance to the outward radial movement of relief valve pistons 70 as induced in said piston by centrifugal force resulting from the rotating movement of the servomotor 18 and turbine 12. Under normal operation of the turbine, it will be seen from FIG. 3, wherein the relief valve piston 70 is in closed position, that said valve piston extends across and closes the fluid conductor passageway between ports 42 and 44 and including the aligned ports 60, 62 and 64, and circular openings 66 which communicates with openings 68. It thus is evident that the relief valve piston effectively blocks passage of fluid between ports 42 and 44 which respectively communicate with the upper and lower ends of the servomotor cylinder and piston, whereby when the relief valve piston 70 is in the closed position shown in FIG. 3, there is no passage of fluid between the upper and lower ends of the servomotor cylinder and piston through ports or passages 42 and 44.

It will be understood that there are other passage means within the servomotor piston 30, details of which are not described herein but are described in said aforementioned Patent No. 2,824,716. Passage of fluid relative to said other passage means comprises the normal operation of the turbine as controlled by the control valve unit 32. Accordingly, it is to be further understood that the ports or passages 42 and 44 pertain only to the by-passing of fluid relative to the opposite ends of servomotor to control runaway speed, when the same occurs above predetermined limits, and for the control of which the spring 72 has been calibrated in resisting movement of the relief valve piston 70 by centrifugal force.

Assume that the turbine is subjected to a runaway speed in excess of a predetermined amount, whereby it is desired to reduce such speed by effecting quick movement of the blades 20 to open position thereof by by-passing fluid from the port 44 to the port 42 in order that pressure against the lower end of servomotor piston 30 will be relieved and said piston may lower within the cylinder 46, whereby the blades 20 of the turbine runner 12 are moved rapidly to the fullest permitted open positions thereof. When such runaway speed is reached, it produces sufficient centrifugal force to counteract the pressure of spring 72 and thereby causes movement of the relief valve piston 70 radially outward to a position where the right-hand end of piston 70, as seen in FIGS.

3 and 4, begins to open the spaced sets of aligned ports 60, 62 and 64, a hydraulic unbalance is produced which varies with the pressure drop through the ports 60, 62 and 64, as well as through circular opening 66 and openings 68 so as to establish fluid communication between ports 42 and 44.

Such hydraulic unbalance renders the outward radial movement of relief valve piston 70 dependent upon the pressure drop and this is undesirable because the speed of movement of the relief valve piston 70, after the ports 60, 62 and 64 start to open, becomes erratic and results in only a creeping action as the rotational speed of the turbine increases. Accordingly, the speed of movement of the valve piston 70 in opening direction may not be sufficient to by-pass an adequate amount of the fluid around the servomotor piston from the lower to the upper end of the servomotor cylinder quickly enough to effect an adequate reduction in the speed of the turbine before damage thereto or to the generator driven thereby may have been caused.

In accordance with the principles of the present invention, speed accelerating and positive actuating means for the relief valve piston 70 are provided comprising flow modifying and additional fluid by-pass structures illustrated in detail in FIGS. 3 and 4. It will be seen therein that the exterior surface of valve piston 70, intermediate of the ends thereof, is provided with a relatively wide annular groove 74, preferably of uniform depth, and a plurality of radial ports 76 extend between the interior of valve piston 70 and the groove 74. The present invention also provides additional aligned ports 78, 80, and 82, which are formed respectively in the cartridge cylinder 58, sleeve valve 56, and hollow housing 52 and, preferably, a plurality of sets of such aligned ports 78, 80 and 82 are provided.

The relative position of the aligned ports 78, 80 and 82 and the annular groove 74 in the valve piston 70 is such that when the leading edge of the annular groove 74 first commences to contact the aligned ports 78, 80 and 82 during outward movement of such valve piston 70, the fluid under pressure in the chamber 84 to the left of the valve piston 70, as viewed in FIGS. 3 and 4, is caused to pass rapidly through the aligned ports 78, 80 and 82 which communicate directly with annular chamber 86, the latter being in direct communication with port 42.

The radially innermost end of valve piston 70 is provided with an accurately sized hole 88 which is concentric with a dashpot 89 having two different diameters as clearly shown in FIGS. 3 and 4. The inner portion 90 thereof is adjustably and threadably secured in a desired position of adjustment to the plug 92 which is connected to the inner end of sleeve valve 56. The diameter of the inner portion 90 is substantially less than that of the hole 88, while the outer end 94 of the dashpot 89 has a diameter which preferably is only slightly smaller than that of the hole 88, whereby the hole 88 will be substantially closed by the larger outer end 94 of the dashpot when the valve piston 70 has moved to open position, such as shown in FIG. 4. The junction between the large and small diametered sections of the dashpot 89 is positioned adjustably so that the right-hand end of the larger portion 94 of the dashpot engages the perimeter of the hole 88 substantially at the time that the aligned ports 60, 62 and 64 are beginning to be opened as a result of movement toward the left of valve piston 70 by centrifugal force.

Hole 88 normally passes fluid to equalize the fluid pressure within and without valve piston 70. However, when the hole 88 of the valve piston is closed by the portion 94 of the dashpot, hydraulic pressure from the pressure end of the servomotor cylinder will act upon the operative pressure face 96 of the piston 70, thereby not only enhancing the speed of movement of the piston to the left, as viewed in FIGS. 3 and 4, but said hydraulic pressure acting upon such piston positively moves the same by an abundance of pressure generated by turbine speeds in excess of normal. Fluid from within the valve piston is freely discharged through radial ports 76, the annular groove 74, and aligned ports 78, 80 and 82 to passage 42. Due to the adjustable positioning which is possible between the dashpot 89 and the plug 92, it will be seen that the substantial closing of the hole 88 by the dashpot relative to the opening of the ports 60, 62 and 64 as a result of opening movement of the valve piston 70 may be adjusted to permit application of positive fluid pressure against the pressure face 96 of piston 70 just when the annular groove 74 is coming into register with aligned ports 78, 80 and 82, whereby not only positive but very rapid movement of the valve piston 70 to open position is effected so as to quickly and substantially fully open the ports 60, 62 and 64 between passageways 42 and 44. Such movement of the valve piston 70 might be defined as a snap-action, considering the rapidity of the ultimate movement of the piston relative to the slow speed at which it is moved by centrifugal force alone to a position where it commences to open the aligned ports 60, 62 and 64.

Once the ports 60, 62 and 64 are opened, and as long as hydraulic fluid passes therethrough, the force of the hydraulic fluid acting upon the valve piston face 96 will be greater than the pressure acting against the interior of the piston, whereby the aligned ports 60, 62 and 64 will remain open because of the pressure drop through the same and the closing or substantial closing of the hole 88 by the portion 94 of the dashpot. Such by-passing of fluid will continue until the blades of the turbine runner have reached the fullest permitted open position thereof and the pressures in the upper and lower servomotor cylinder chambers have become balanced. When this occurs, hydraulic pressures on the interior of the valve piston 70 and against the pressure face 96 thereof will have become substantially equalized, whereby the force of the spring 72 once more will be effective to move the valve piston 70 to the closed position thereof, shown in FIG. 3. The slower speed resulting from the reduction of the runaway speed of the turbine will result in a decreased centrifugal force upon the valve piston 70, whereby the ability of spring 72 to move the piston to closed position will be further enhanced.

After the speed of the turbine has been reduced to safe limits and danger of damage to the equipment is past, the cause of the runaway speed can be investigated and, if necessary, the turbine can be shut down to obviate the malfunction or any other situation causing the runaway speed. It will be seen, howeevr, that the present invention provides means affording substantially snap-action for the movement of a relief valve piston to open position to thereby effect a rapid by-passing of fluid from the increased pressure side of the servomotor piston to the opposite side thereof, in order that the blades of the runner may be moved quickly to the greatest permitted open position thereof, whereby the speed of the turbine will be rapidly decreased to safe limits.

While the invention has been described and illustrated in its several preferred embodiments, it should be understood that the invention is not to be limited to the precise details herein illustrated and described since the same may be carried out in other ways falling within the scope of the invention as claimed.

I claim:

1. A by-pass relief valve arrangement for operation in a servomotor for controlling the pitch of the blades of a hydraulic turbine, said arrangement comprising conductor means, and a relief valve unit comprising a relief valve piston member movable relative to said conductor means to open the same in response to centrifugal force of a predetermined amount, a spring fixed at one end relative to said unit and operable normally to oppose such movement of said valve piston to open said conductor means, normal fluid passage means in said valve piston operable to pass fluid therethrough to equalize the fluid pressure on opposite ends thereof, means operable to substantially close said opening when said valve piston moves a predetermined amount in response to centrifugal force to render said valve piston responsive to fluid pressure from the pressure side of said conductor means, and auxiliary fluid by-pass means in said piston valve operable upon said fluid equalizing opening means being substantially closed to permit the passage of fluid from within said piston valve to the relief side of said conductor means, thereby to render positive and rapid movement of said valve piston to open said conductor means after said valve piston has been moved a predetermined distance by centrifugal force toward open position.

2. A by-pass relief valve arrangement for operation in a servomotor for controlling the pitch of the blades of a hydraulic turbine, said arrangement comprising conductor means, and a relief valve unit comprising a relief valve piston having a pressure face, means to guide said valve piston for substantially radial movement across the passageway of said fluid conductor means and movable radially in one direction in response to centrifugal force of a predetermined amount to open said passageway, said valve piston being ported in the pressure face thereof for normal equalizing flow of hydraulic fluid therethrough, means operable substantially to close the port in said pressure face when said relief valve piston moves a predetermined amount toward open position, and auxiliary fluid bypass means in said relief valve unit operable upon said port in said pressure face being substantially closed to permit the passage of fluid from within said relief valve unit to the relief side of said conductor means, thereby to permit hydraulic fluid to operate against said pressure face of said valve piston and positively move the same to open said fluid conductor passageway for the conducting of fluid rapidly from one end to the other thereof.

3. A by-pass relief valve arrangement for operation in a servomotor for controlling the pitch of the blades of a hydraulic turbine, said arrangement comprising conductor means, and a relief valve unit comprising a relief valve piston, means to guide said piston for substantially radial movement across the passageway of said fluid conductor means and movable radially outward in response to centrifugal force of a predetermined amount, said valve piston being ported for normal equalizing flow of hydraulic fluid therethrough, means operable substantially to render said equalizing port of said valve piston substantially ineffective when said relief valve piston has moved a predetermined amount toward open position, and annular groove means on said valve piston intermediate the ends thereof communicable with auxiliary port means in said piston guide means to said conductor passageway when said valve piston has moved a predetermined amount in response to centrifugal force, thereby permitting the flow of hydraulic fluid from the interior of said relief valve piston to the relief side of said conductor passageway, thereby to render positive and rapid the movement of said relief valve to open said conductor passageway for passage of hydraulic fluid therethrough.

4. A by-pass relief valve arrangement for operation in a servomotor for controlling the pitch of the blades of a hydraulic turbine, said arrangement comprising conductor means, and a relief valve unit comprising a relief valve piston movable in response to centrifugal force relative to said conductor means to open and close the same, equalizing port means in said relief valve piston operable normally to pass fluid to equalize fluid pressure on opposite sides of said relief valve piston, pressure means operable to resist movement of said valve piston by centrifugal force, plugging means substantially stationary relative to said relief valve unit and operable when said relief valve piston has been moved a predetermined amount by centrifugal force to be received within said equalizing port of said piston and close the same, and auxiliary bypass means in said relief valve unit operable upon said equalizing port being closed to permit the passage of fluid from within said relief valve unit to the relief side of said conductor means, thereby to subject the valve piston to positive pressure from fluid in the pressure end of said conducting means, thereby positively to move said valve piston against the action of said pressure means to accelerate the movement of said valve piston substantially to produce a snap-action thereof to open position.

5. A by-pass relief valve arrangement for operation in a servomotor for controlling the pitch of the blades of a hydraulic turbine, said arrangement comprising conductor means, and a relief valve unit comprising a relief valve member movable normally by centrifugal force relative to said conductor means from closed to open positions relative to said conductor means, said relief valve member having normal fluid passage means therein operable to permit equalizing of fluid pressures on opposite ends thereof, one of said ends being subjectable to the force of the pressure side of said by-pass conductor means, said relief valve unit also having auxiliary passage means therein communicating with the relief side of said by-pass conductor means and normally closed by said relief valve member, and passage closing means carried by said relief valve unit and operable to close said normal fluid passage means in said relief valve member when said valve member is moved a predetermined distance by centrifugal force and thus simultaneously opening said auxiliary passage means, thereby to permit full application of fluid pressure from the pressure side of said by-pass conductor means against said one end of said relief valve member and simultaneously permit relief of pressure from the opposite end of said valve member into the relief side of said conductor means and thus substantially effect snap-action of said relief valve to full open position relative to said by-pass conductor means.

6. The relief valve unit set forth in claim 5 further characterized by said unit comprising a hollow cylindrical housing and said valve member being a hollow piston slidable axially therein and fully open at one end, the other end of said piston having said normal fluid passage means therein which comprises a hole of substantially less diameter than that of said piston valve member, and a shaft of several different diameters interconnected to said housing and extending coaxially of said piston valve member and through said hole therein to function as closing means therefor in one position of said valve member relative to said shaft.

7. A by-pass relief valve arrangement for operation in a servomotor for controlling the pitch of the blades of a hydraulic turbine, said arrangement comprising conductor means, and a relief valve unit comprising a relief valve member movable by centrifugal force relative to said conductor means from a position to close to a position to open said conductor means, pressure exerting means normally operable upon said valve to resist movement of said valve member to open position, and means operable to implement the use of fluid pressure against one end of said valve member from the pressure side of said by-pass conductor means when said valve member has been moved a predetermined distance toward open position, thereby to supplement the effect of centrifugal force to move said valve positively and substantially with a snap-action to full open position after said valve member has been moved said predetermined distance toward open position.

References Cited in the file of this patent

UNITED STATES PATENTS

| | | |
|---|---|---|
| 1,965,526 | Willson | July 3, 1934 |
| 2,697,441 | Hobbs | Dec. 21, 1954 |
| 2,711,749 | Hettinger | June 28, 1955 |
| 2,824,716 | Voaden | Feb. 25, 1958 |
| 2,840,344 | Stage | June 24, 1958 |
| 2,922,621 | Fisch | Jan. 26, 1960 |